United States Patent [19]

Kibune

[11] Patent Number: 5,159,587
[45] Date of Patent: Oct. 27, 1992

[54] SEPARATION TYPE OPTICAL PICK-UP DEVICE

[75] Inventor: Hideaki Kibune, Kawasaki, Japan

[73] Assignee: Ricoh Company, Ltd., Tokyo, Japan

[21] Appl. No.: 444,821

[22] Filed: Dec. 1, 1989

[30] Foreign Application Priority Data

Dec. 2, 1988 [JP] Japan ................ 63-305580

[51] Int. Cl.⁵ ............................................. G11B 7/00
[52] U.S. Cl. ...................... 369/44.14; 369/114; 369/44.22; 369/44.42
[58] Field of Search ............ 369/44.14, 112, 111, 369/44.13, 44.42, 44.37, 44.38, 44.41, 114, 119, 44.21, 44.22, 32

[56] References Cited

U.S. PATENT DOCUMENTS

| | | | |
|---|---|---|---|
| 4,466,087 | 8/1984 | Cheng | 369/44.14 |
| 4,782,474 | 11/1988 | Arai et al. | 369/44.14 |
| 4,807,212 | 2/1989 | Kaneda et al. | 369/44.14 |
| 4,822,139 | 4/1989 | Yoshizumi | 369/32 |
| 4,823,334 | 4/1989 | Tanaka et al. | 369/112 |
| 4,841,512 | 6/1989 | Kubota et al. | 369/58 |
| 4,973,831 | 11/1990 | Kyouya | 369/44.14 |
| 5,031,165 | 7/1991 | Fujita | 369/44.28 |
| 5,048,001 | 9/1991 | Moriya et al. | 369/32 |
| 5,060,213 | 10/1991 | Kamisada | 369/44.21 |
| 5,060,214 | 10/1991 | Nakayama et al. | 369/44.26 |
| 5,068,843 | 11/1991 | Takeshita et al. | 369/44.27 |
| 5,073,884 | 12/1991 | Kobayashi | 369/44.41 |

*Primary Examiner*—Roy N. Envail, Jr.
*Assistant Examiner*—Nabil Hindi
*Attorney, Agent, or Firm*—Cooper & Dunham

[57] ABSTRACT

The separation type optical pick-up device includes a movable optical unit and a stationary optical unit having a detection portion for detecting a discrepancy between an optical axis of a light beam emitted from an emitting portion of the stationary optical unit and an optical axis of a light beam returned from the movable optical unit, and is adapted to correct the discrepancy while driving a carriage of the movable optical unit on the basis of the detected discrepancy.

3 Claims, 5 Drawing Sheets

SEPARATION TYPE OPTICAL PICK-UP DEVICE

BACKGROUND OF THE INVENTION:

This invention relates to a separation type optical pick-up device adapted to correct a discrepancy between an optical axis of a light beam emitted from an emitting portion of a stationary optical unit and an optical axis of a light beam returned from a movable optical unit.

An optical pickup device is known as a device for recording or reproducing information into or from an optical information recording medium such as an optical disk and various types of the device have been put to practical use.

In a conventional optical pickup device, an access operation and a tracking operation are carried out by providing the whole optical pickup device adjacent an optical information recording medium and positioning at the track on the medium so that the optical pickup device in weight is an obstacle for the increase in access speed.

In consideration of this, recently, a separation type optical pickup device, which is an optical pickup device divide into two portions, one for a stationary optical unit and the other one for a movable optical unit, operable to access by fixing the stationary optical unit and moving the movable optical unit has been proposed.

The stationary optical unit for the separation type optical pickup device includes means for emitting light including a semiconductor laser, and signal detecting means for detecting track error signal, focus error signal and RF signals. The movable optical unit also includes an object lens, a focus actuator, a tracking actuator, and a deflecting member. The movable optical unit may include tracking mirror means instead of the tracking actuator and the deflecting member.

The focus actuator is provided to move the object lens in the axial direction of the laser beam, whereby the laser beam from the stationary optical unit is focused properly onto the recording surface of the optical information recording medium.

The tracking actuator is also provided to move the object lens in the direction of crossing at right angles with the optical axis of the laser beam, whereby the focused position of said laser beam is not turned from the track.

The tracking mirror means is provided for the tracking operation by which the direction of the laser beam incident on the object lens is changed by changing the inclination of the tracking mirror.

The optical axis of the object lens shifts in parallel with the optical axis of the incident light beam from the stationary optical unit, when the position of the object lens is moved in the direction of crossing at right angles with the optical axis of the laser beam with the tracking actuator. On tracking operation by the tracking mirror system, the optical axis of the incident light beam shifts at an angle with the optical axis of the object lens.

Such a shift between the optical axes causes a discrepancy between the optical axis of laser beam emitted from the stationary optical unit and the optical axis of light beam which is reflected by the optical information recording medium and coming into the stationary optical unit again through the movable optical system. The discrepancy causes an error in focus error signals, a change in the diameter of the light spot on the optical information recording medium, and inconvenient states in that a direction for the movement of the object lens in the tracking direction goes over the movable range of the tracking, and in that a direction for the rotation of the tracking mirror in the tracking direction goes over the movable range of the tracking mirror rotation.

As a method of solving such problems, it has been intended that the discrepancy of the optical axes is minimized by loading light detecting means in combination with LED (light emitting diode) and light receiving element on the movable optical unit, detecting the position of the tracking direction for the object lens, detecting the inclination of the tracking mirror and moving the movable optical unit by drive means based on the result detected to keep the normal position between the optical recording medium and the movable optical unit.

However, this method includes several problems in that there is a increase in weight due to the optical detecting means loaded on the movable optical unit and it reduces one of the advantages of the separation type optical pickup device, and also the optical detecting means is easily affected by noises accompanied with the movement of the movable optical unit, therefore, there is also another problem in reliability.

Furthermore, recently, provision of the tracking mirror on the stationary optical unit has been intended to make the best use of advantages of the separation optical pickup device. However, such provision does not solve the problems in the discrepancy of the optical axes and also optical detecting means for detecting the inclination of the tracking mirror needs to be provided on the stationary optical unit. On this type of optical pickup, loading said optical detecting means on the stationary optical unit has been a chief problem in designing, and further more problem is that the optical axis is not properly corrected only by detecting the inclination of the tracking mirror because the precision in detecting the inclination of the tracking mirror changes in response to the seek position of the movable optical unit.

SUMMARY OF THE INVENTION

This invention is made in consideration of the matter mentioned above, and its object is to provide new method of correcting discrepancy between optical axes, which is capable of aligning an optical axis of a laser beam properly with an optical axis of the light returned without increase in weight for a movable optical unit used in such the separation optical pickup device as mentioned above.

According to this invention, the object mentioned above is accomplished by the following first, second, and third inventions.

The first invention mentioned above relates to a separation type optical pick-up device, comprising: emitting unit fixed on a stationary base for emitting a light beam; a beam splitter fixed in an optical path of the emitted light beam on the stationary base for splitting the emitted light beam into two beams; a carriage movably disposed along an optical path of one of the splitted light beam; deflection unit mounted on the carriage for deflecting the one of the splitted light beam toward an optical information recording medium; an object lens movably mounted on the carriage for condensing the deflected light beam on the optical information recording medium; a focus actuator mounted on the carriage for moving the object lens so as to focus, the object lens; a tracking actuator mounted on the carriage for moving the object lens so as to track a track of the optical information recording medium; a detection unit disposed fixedly on the stationary base for receiving a returned light beam which is reflected on the optical information recording medium and then deflected in turn on the deflection unit and the beam splitter and for detecting a discrepancy between an optical axis of the emitted light beam and an optical axis of the returned light beam; and a unit for driving said carriage so as to correct the discrepancy on the basis of the detected discrepancy.

The second invention mentioned above relates to a separation type optical pick-up device, comprising: emitting unit fixed on a stationary base for emitting a light beam; a beam splitter fixed in an optical path of the emitted light beam on the stationary base for splitting the emitted light beam into two beams; a carriage movably disposed along an optical path of one of the splitted light beam; a tracking mirror unit mounted on the carriage for deflecting the one of the splitted light beam toward an optical information recording medium, and for tracking a track of the optical information recording medium; an object lens movably mounted on the carriage for condensing the deflected light beam on the optical information recording medium; a focus actuator mounted on the carriage for moving the object lens so as to focus the object lens; a detection unit disposed fixedly on the stationary base for receiving a returned light beam which is reflected on the optical information recording medium and then deflected in turn on the tracking mirror unit and the beam splitter and for detecting a discrepancy between an optical axis of the emitted light beam and an optical axis of the returned light beam; and a unit for driving the carriage so as to correct the discrepancy on the basis of the detected discrepancy.

The third invention mentioned above relates to a separation type optical pick-up device, comprising: emitting unit fixed on a stationary base for emitting a light beam; a beam splitter fixed in an optical path of the emitted light beam on the stationary base for splitting the emitted light beam into two beams; a first deflection prism fixed in an optical path of one of the splitted light beam on the stationary base for deflecting the one of the splitted light beam in a direction of crossing the optical path of the one of the splitted light beam; tracking mirror unit fixed in an optical path of the light beam deflected by the first deflection prism on the stationary base for deflecting the light beam deflected by the first deflection prism in a direction of crossing the optical path of the light beam deflected by the first deflection prism and for tracking a track of an optical information recording medium; a carriage movably disposed along the optical path of the light beam deflected by the tracking mirror unit; a second deflection prism mounted on the carriage for deflecting the light beam deflected by the tracking mirror unit in a direction of crossing said optical path of the light beam deflected by the tracking mirror unit; an object lens movably mounted on the carriage for condensing the light beam deflected by the second deflection prism on the optical information recording medium; a focus actuator mounted on the carriage for moving the object lens so as to focus the object lens; a detection unit disposed fixedly on the stationary base for receiving a returned light beam which is reflected on the optical information recording medium and then deflected in turn the second deflection prism, said tracking mirror unit, the first deflection prism and the beam splitter, and for detecting a discrepancy between an optical axis of the emitted light beam and an optical axis of the returned light beam; and a unit for driving said carriage so as to correct the discrepancy on the basis of the detected discrepancy.

According to this invention, the object mentioned above is accomplished by the following first, second, and third inventions.

In the aforementioned first, second, and third invention, a split light receiving element having a split line of a direction corresponding to the direction of the track of an optical information recording medium is provided in the signal detecting means of a stationary optical unit. Accordingly, the light returned from the optical information recording medium is used to find the difference between a first quantity of the light received at the part of one side on the split light receiving element defined by the split line and a second quantity of the light received at the part of the other side on said split light receiving element defined by said split line, so that in detecting the difference, the provision of an exclusive light source is not required to detect this difference.

The aforementioned "split light receiving element", as will be described later in the embodiment, may be used as an exclusive one to detect the difference between the first quantity of the light received and the second quantity of the light received, and also can be used for detecting focusing error signals, tracking error signals and RF signals.

As mentioned above, in this invention, "discrepancy of optical axes" can be detected by the use of signal detecting means, since the optical axis of the returned light beam coming again from the optical information recording medium into the stationary optical unit shifts relative to the optical axis of the laser beam emitting from the stationary optical unit when this discrepancy of optical axes occurs.

In the third invention, there are detected through the split light receiving element signals representing the difference between the first quantity of the light received and the second quantity of the light received are corrected in response to the seek position of the movable optical unit.

Methods related to the first, second, and the third inventions are configured as mentioned above, whereby enabling an increase in access speed with a reduction in weight for the movable optical unit and a proper correction for the discrepancy of optical axes with high reliability.

A focusing operation, a tracking operation, and the detection of RF signals are carried out not only by the methods described later, but also by the various methods in the prior art.

Further objects and advantages of the present invention will be apparent from the following description of the preferred embodiments of the invention as illustrated in the accompanying drawings.

DESCRIPTION OF THE PREFERRED EMBODIMENTS:

The first invention, the second invention and the third invention are described in sequence in accordance with the embodiments with reference to the drawings.

Figure 1:
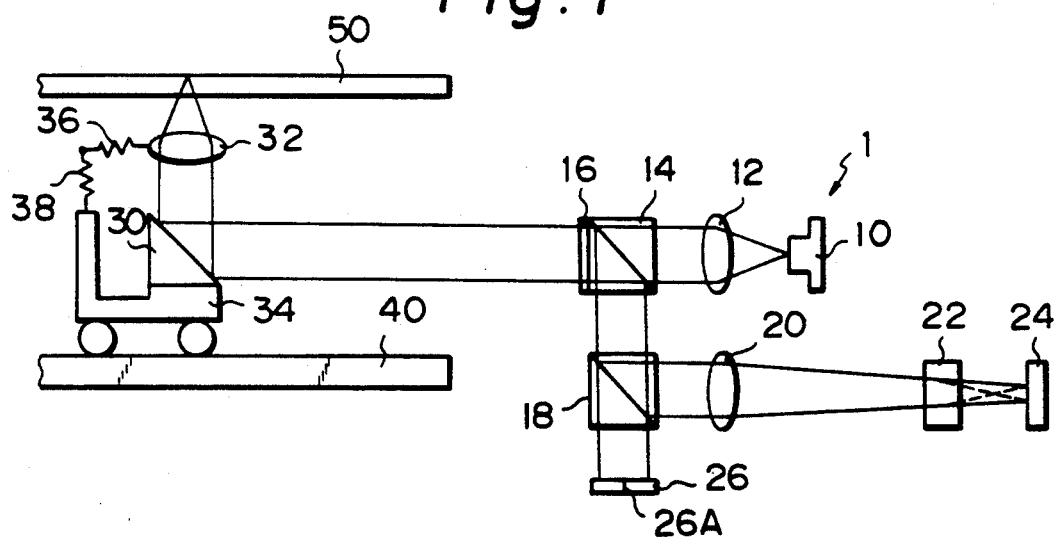
FIG. 1 and FIG. 2(a) and 2(b) are drawings for illustrating one embodiment of the first invention.

Referring to the drawings, FIG. 1 shows one embodiment of the first invention. In the drawing, a reference number 1 indicates a stationary optical unit.

A laser beam is emitted in parallel from light emitting means constructed with a semiconductor laser 10 and a coupling lens 12, and passes through a deflection beam splitter 14 and a quarter wave plate 16 and then the light beam is emitted from the stationary optical unit 1 and goes into the movable optical unit.

The movable optical unit has a carriage 34 movable in the radial direction of an optical disk 50 as an optical information recording medium on guide rails 40 and a deflection prism 30 as a deflection member, an object lens 32, a focus actuator 38, and a tracking actuator 36 are loaded on the carriage 34.

The light beam from the stationary optical unit 1 is reflected by the deflection prism 30 and deflected toward the optical disk 50, then converged onto the recording surface of the optical disk 50 by the object lens 32.

The reflected light beam from the optical disk 50 passes through the object lens 32 again, and becomes a returned light via the deflection prism 30 and goes, into the quarter wave plate 16 of the stationary optical unit. The returned light passing through the quarter wave plate 16 is reflected by the deflection beam splitter 14 in the lower direction in the FIG. 1 and divided into two beams of the light by a beam splitter 18. One of the divided light beams is converged by a condenser lens 20 to go into a cylindrical lens 22. The light beam incident into the cylindrical lens 22 is given astigmatism and then received into a receiving element 24.

Focus error signals by the astigmatic method known in the art and tracking error signals by the pre-wobbling method are obtained from the receiving element 24. On the basis of these signals, a focusing operation and a tracking operation are performed by servo means driving the focus actuator 38 and the tracking actuator 36 to move the object lens 32.

The other light beam divided by the beam splitter 18 is received into a light receiving element 26 in a state of a parallel light beam. The light receiving element 26 having a split line 26A is a "split light receiving element" split into two parts and the direction of the split line 26A corresponds to the track direction of the optical disk 50. Namely, the direction from left to right in the FIG. 1 is the direction crossing the track at the right angle, and also simultaneously the direction crossing the split line 26A at the right angle.

Signal detecting means includes the quarter wave plate 16, the deflection beam splitter 14, the beam splitter 18, the condenser lens 20, the cylindrical lens 22, and the light receiving elements 24, 26.

A beam of light incident on the light receiving element 26 is a laser beam, so that its strength will be a distribution similar to Gauss' distribution. The states of the light strength distribution on the light receiving element 26 are shown with curves 2-1, 2-2 in FIGS. 2a, 2b.

Figure 2A:
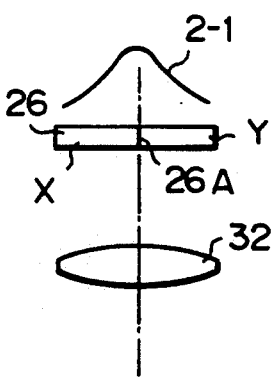
Figure 2B:
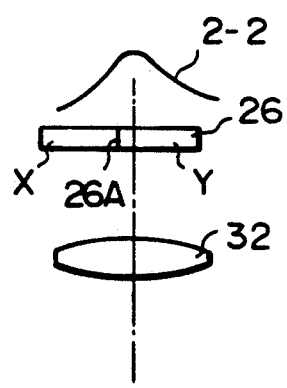

The position of the split line 26A on the light receiving element 26 is determined in such a manner that the position of the maximum value on the strength distribution 2-1 appears on the position of the split line 26A on the light receiving element 26 as shown in FIG. 2a, when there is no discrepancy between the optical axis of the light beam emitted from the stationary optical unit 1 and the optical axis of the returned light beam from the movable optical unit, namely, the optical axis of the returned light beam from the movable optical unit 1 and the optical axis of the object lens 32 are aligned with each other. Consequently, in the state of not existing "discrepancy between optical axes", the incident light on the light receiving element 26 equals in quantity at its light receiving portion x and light receiving portion y, however, in occurrence of "discrepancy between optical axes", the respective quantities of the lights received at the light receiving portion x and the light receiving portion y become unsymmetrical with respect to the split line 26A in the strength distribution 2-2 and loses the equality for each.

Consequently, producing $(V_x - V_y)$ with voltage signal $V_x$ and voltage signal $V_y$ obtained by converting photoelectrically the outputs from the light receiving portion x and the light receiving portion y, this signal $(V_x - V_y)$ will be proportional to the discrepancy between the optical axis of the object lens 32 and the optical axis of light beam going from the stationary optical unit to the object lens 32.

Therefore, this signal $(V_x - V_y)$ is used as "position detecting signals" of the object lens 32, and the movement of the carriage 34 of the movable optical unit in the radial direction of the optical disk is serve-controlled on the basis of this position detecting signals in such a manner that the position detecting signals reaches zero. This control is performed by a seek motor. Thus, the whole movable optical unit shifts in accordance with the movement of the object lens 32 with tracking operation in such a manner that the discrepancy between the optical axis of the object lens and the optical axis of the light beam incident thereon from the stationary optical unit 1 is getting smaller at all the times, therefore "discrepancy between optical axes" is corrected to be always minimized.

Signals into which the sum of the output from the light receiving element 24 or the sum total of the output from the light receiving elements 24, 26, is photoelectrically converted may be used as the RF signals.

Figure 3:
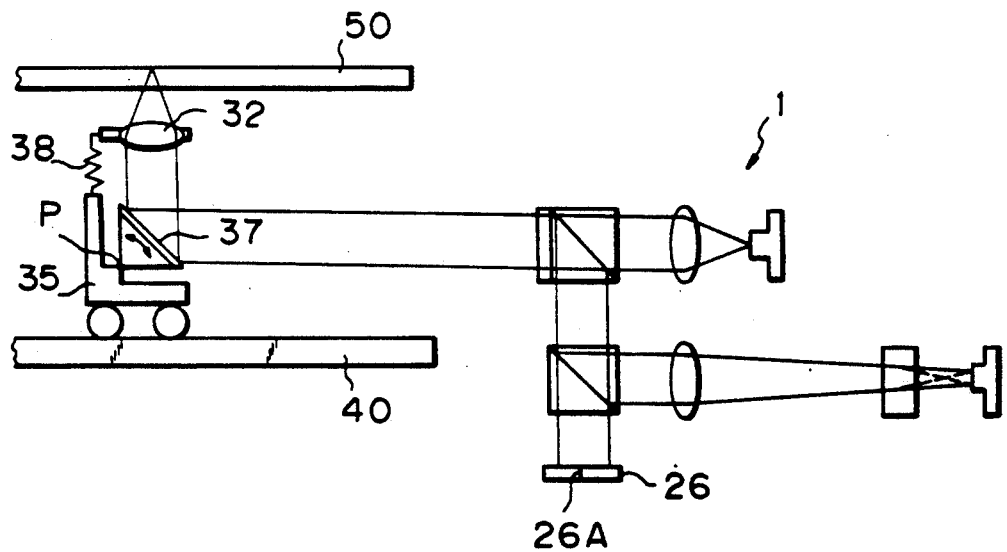
FIG. 3 is a drawing for illustrating one embodiment of the second invention.

FIG. 3 shows one embodiment of the second invention. The same reference number as in FIG. 1 for reference items that may be not mixed up with others, is used in FIG. 3 to avoid its complexity. A stationary optical unit is the same as in FIG. 1. A movable optical unit is provided with a tracking mirror means, a carriage 35, an object lens 32, and a focus actuator 38 thereonto.

A tracking mirror means includes the tracking mirror 37 shown in the drawing, and a swinging mechanism (not shown) to swing the mirror about a swinging center P. A tracking operation is carried out in the manner of deflecting the direction of the light beam incident of the object lens 32 by swinging the tracking mirror 37. In this tracking method, discrepancy between optical axes occurs in such a manner that the optical axis of the light beam incident on the object lens 32 and the optical axis of the object lens cross to each other with the tracking operation. However, in this embodiment, the signal $(V_x - V_y)$ obtained from the light receiving element 26 is also proportional to this "discrepancy between optical axes". Therefore, the preferred correction of the discrepancy between optical axes can be attained by using the signal $(V_x - V_y)$ as the inclination detecting signal of the tracking mirror 37 and servo-controlling the movement of the carriage 35 on the movable optical unit in the radial direction of the optical disk on the basis of the inclination detecting signal in such a manner that the inclination detecting signal reaches zero.

Figure 4:
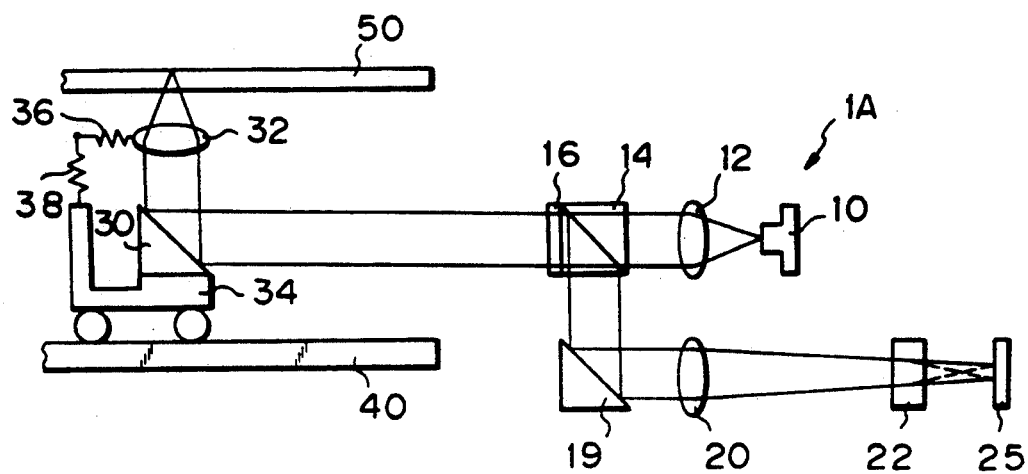

FIG. 4 shows the other embodiment of the first invention. The difference from FIG. 1 are that a signal detecting means on the stationary optical unit 1A has a deflection prism 19 instead of the beam splitter 18 so that all of the light returned goes into the light receiving element 25.

Namely, in this embodiment, all signals including the RF signals, the focus error signals, the tracking error signals, and the position detecting signals of the object lens are obtained from the output of light receiving element 25.

The returned light is converged by the condenser lens 20, and the thus converged light is given an astigmatism by the cylindrical lens 22 and then received in the light receiving element 25.

Figure 5:
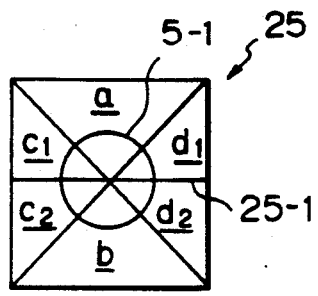
FIG. 4 to FIG. 6 are drawings for illustrating the other embodiment of the first invention.

The light receiving element 25 as shown in FIG. 5 has a split line 25-1 in addition to the usual light receiving element split into four portions, and is a "split type light receiving element" in which voltage signals A, B, C1, C2, D1, and D2 can be obtained by photoelectrically converting respectively the outputs of six light receiving portions a, b, c1, c2, d1 and d2 split on a light receiving surface. The direction of the split-line 25-1 corresponds to the direction of the track on the optical disk 50. The light receiving element 25 is arranged at the position where the sectional shape of the incident light beam 5-1 is a circle in the focused state, and adjustably positioned so that the position of the optical axis of the incident light beam is on the intersection point of the split-lines.

Accordingly, a focusing operation may be carried out by driving by servo-control the focus actuator 38 in such a manner that the signal $(A+B)-(C1+C2+D1+D2)$ reaches zero while using the signal $(A+B)-(C1+C2+D1+D2)$ as the focus error signal. $(A+B+C1+C2+D1+D2)$ may be used as the RF signals.

The signal $(A+C1+D1)-(B+C2+D2)$ corresponding to the differences between the quantities of the lights received at both sides of the split-line 25-1, are used as the position detecting signal of the object lens 32 for the same reason as that of the embodiment in FIG. 1, and on the basis of the signal $(A+B+C1+C2+D1+D2)$, the carriage 34 is moved with servo-control by the seek motor in such a manner that the signal $(A+B)-(C1+C2+D1+D2)$ reaches zero, whereby the desired correction of the discrepancy between optical axes can be carried out.

In this embodiment, the tracking is may be carried out by the pre-wobbling method known in the art.

This method is carried out as follows.

Figure 6:
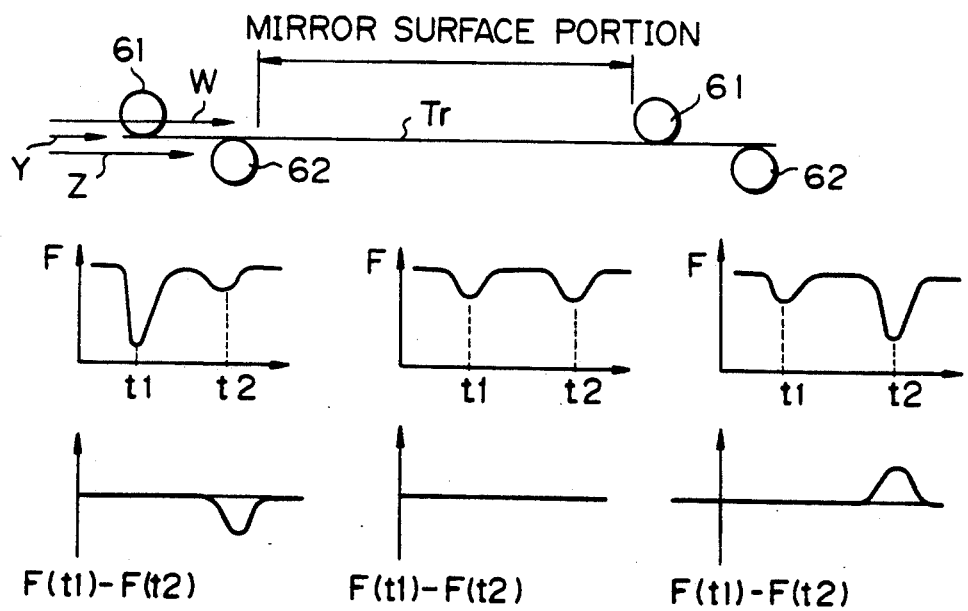

In each track on an optical disk 50 as an optical information recording medium, a pair of pre-wobbling pits 61, 62 are formed at even pitches as shown in FIG. 6. This pair of pre-wobbling pits 61, 62 mounts up to more than a thousand (1,000) pairs per round of the track. The pre-wobbling pits 61, 62 are so formed as to be staggered to each other on both sides of the center of the track and to reach a depth of a quarter wavelength λ of the laser in use.

Now, when a spot of laser beam converged by the object lens 32 scans the position shifted over the track Tr as indicated with arrow mark W in the upper part of FIG. 6, the state of overlapping between the spot and pit is great at the pre-wobbling pit 61 and less at the pit 62. The reflected light from the overlapped part is shifted in wavelength by $\frac{1}{2}\lambda$ in comparison with the reflected light from the other part, so that the strength of the reflected light is reduced by the interference. The degree of the reduction is inversely proportional to the area overlapping between the spot and pre-wobbling pit.

Therefore, if the times required for the spot to pass though the respective positions of prewobbling pits 61, 62 are t1 and t2, respectively, all output F of the light receiving element 25 corresponding to the RF signal will be, in that case, as shown in the drawing on the left in the middle of FIG. 6. Holding the magnitude F(t1) of F at t1 until t2, and producing the difference $F(t1)-F(t2)$ with the magnitude F(t2) at t2, the result will be as shown in drawing on the left in the lower part of FIG. 6. Similarly, when the locus of the spot is in the position shifted under the track Tr as indicated with arrow mark Z in the upper part of FIG. 6, the change in F is as shown in the middle on the right of FIG. 6 and the difference $F(t1)-F(t2)$ is as shown in the lower on the right of the same drawing.

When the locus of the spot is on the track Tr as indicated with arrow mark Y in the upper part of FIG. 6, the change in F and $F(t1)-F(t2)$ are as shown in the middle and lower drawings in the center of FIG. 6.

Consequently, a tracking operation can be carried out with the use of the difference $F(t1)-F(t2)$ as the tracking error signal.

Figure 7:
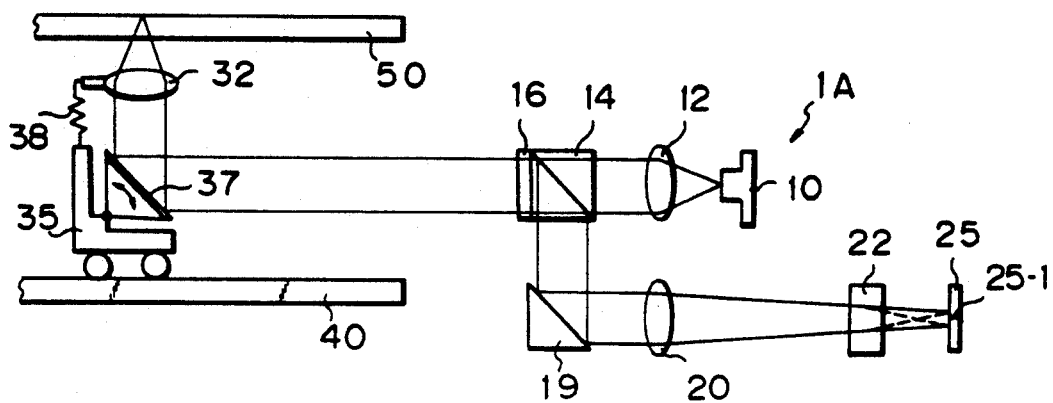
FIG. 7 is a drawing for illustrating the other embodiment of the second invention.

FIG. 7 shows the other embodiment of the second invention. This invention is a combination of said stationary optical unit 1A in FIG. 4 with the movable optical unit in the embodiment of FIG. 3. Therefore, RF signal, focus error signal, and tracking error signal are the same as those used in the embodiment of FIG. 4, and the signal $(A+C1+D1)-(B+C2+D2)$ corresponding to the difference between the quantities of the lights received on the both sides of the split-line 25-1 is used as the inclination detecting signals the tracking mirror 37, and on the basis of the signal $(A+C1+D1)-(B+C2+D2)$, the carriage 35 is drived by the seek motor by servo control in such a manner that the signal $(A+C1+D1)-(B+C2+D2)$ reaches zero discrepancy between optical axes can be preferably corrected.

Figure 8:
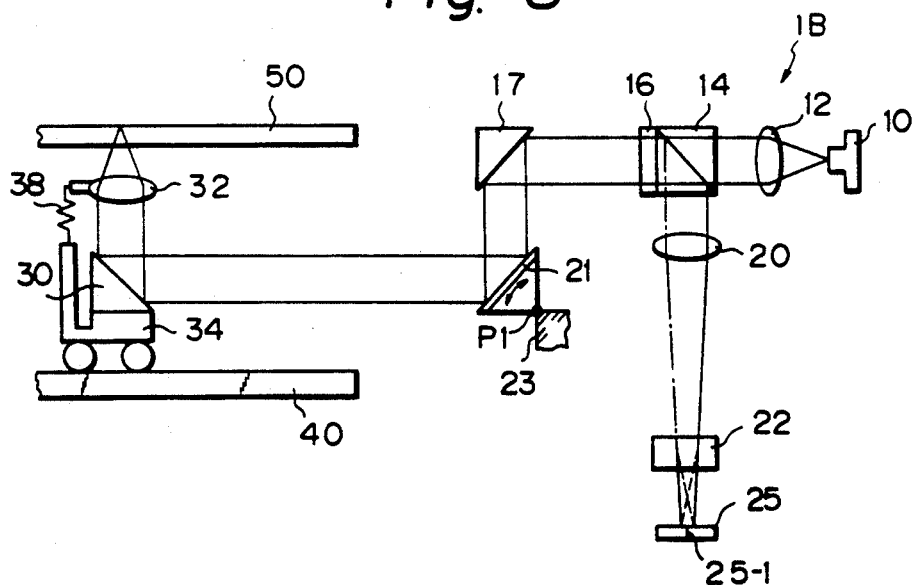
FIG. 8 to FIG. 11 are drawings for illustrating one embodiment of the third invention.

FIG. 8 shows one embodiment of the third invention. In this embodiment, a movable optical unit has a carriage 34 loaded with a deflection prism 30, an object lens 32, and a focus actuator 38 thereon, the weight of the movable optical unit is lighter than that of the other four embodiments mentioned above.

A stationary optical unit 1B has a deflection prism 17 and a tracking mirror means. The returned light which is reflected from an optical disk 50 goes into a quarter wave plate 16 through the tracking mirror 21 of the tracking mirror means and the deflection prism 17, and then, goes into a light receiving element 25 via a deflection beam splitter 14, a condenser lens 20, and a cylindrical lens 22. The light receiving element 25 is the same as "split type light receiving element" described in accordance with FIG. 5, therefore, focus error signal, RF signal, and tracking error signal are the same as in the embodiment of FIG. 7, a tracking operation is carried out by swinging by servo-control the tracking mirror 21 about the center of swinging movement Pl on the basis of the tracking error signal. The reference number 23 in FIG. 8 indicates a fixed member of the stationary optical unit 1B supporting the tracking mirror 21.

Even the tracking mirror means is provided on the stationary optical unit 1B, in the same way as the embodiment of FIG. 7, the signal (A+C1+D1)−(B+C2+D2) corresponding to the difference between the quantities of the lights received on both sides of the split-line 25-1 can be used as the inclination position detecting signal, but this inclination position detecting signals do not always provide the proper inclined position of the tracking mirror 21.

Figure 10:
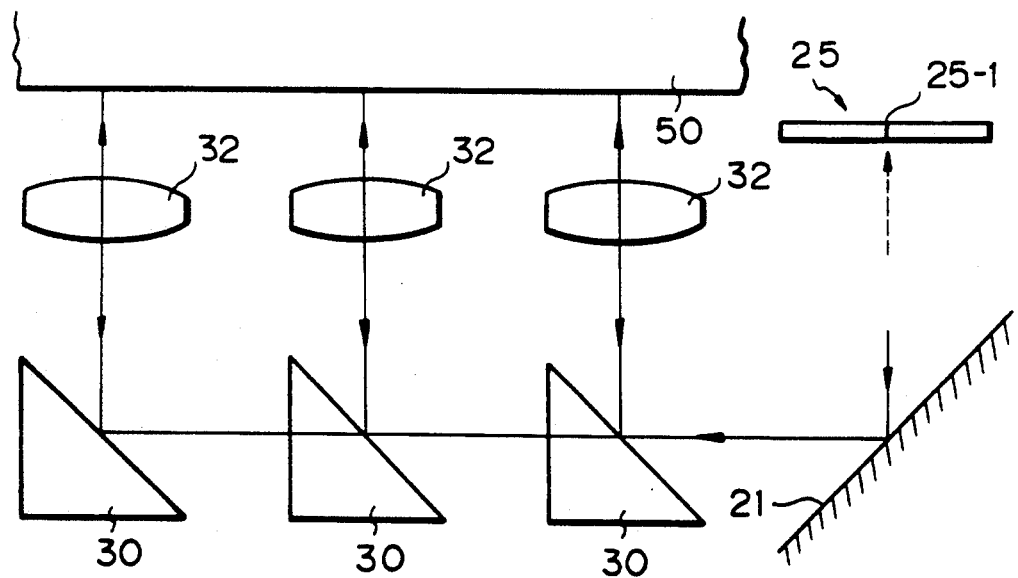
Figure 11:
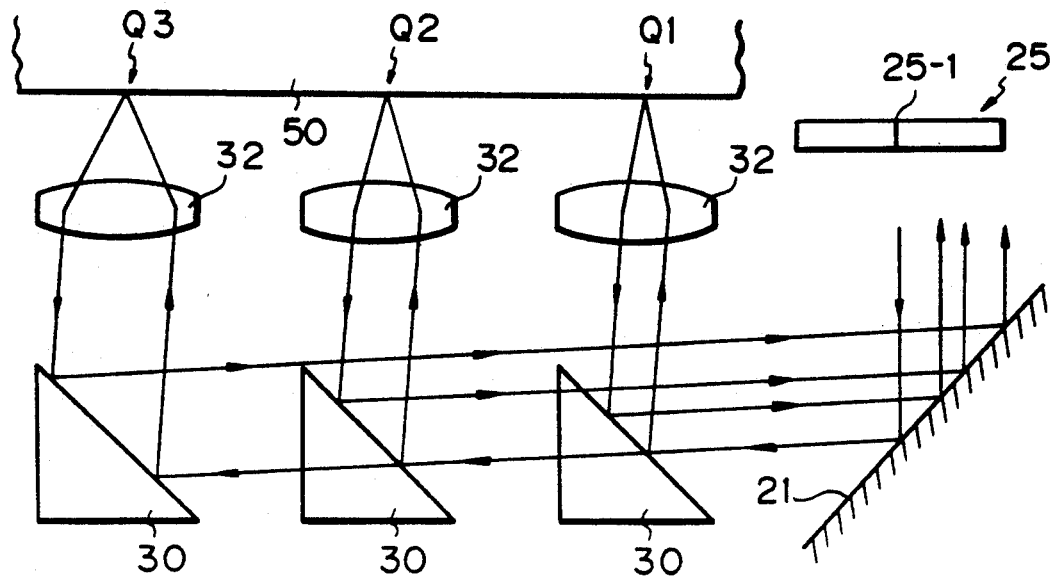

Namely, as in FIG. 10, there is no problem when the optical axis of the incident light beam from the stationary optical unit 1B is aligned with the optical axis of the object lens 32, but when there is such "discrepancy between the axes" that the axis of the object lens and the axis of the incident light beam on the object lens cross each other, the inclination is steady but the incident state of the light beam on the light receiving element 25 is different as the position of the movable optical unit changes like Q1, Q2, and Q3, even if the inclination position of the tracking mirror 21 is steady. In other word, the signal (A+C1+D1)−(B+C2+D2) do not proportionally correspond to the "discrepancy between the optical axes", and changes by the "discrepancy between the optical axes" and the position of the movable optical unit. This occurs because the length of optical path from the tracking mirror to the deflection prism 30 changes by the seek position of the movable optical unit. Therefore, when the seek position is fixed, the signal (A+C1+D1)−(B+C2+D2) corresponds proportionally to the "discrepancy between the optical axes", so that for precisely correcting the discrepancy between the optical axes, aforementioned "inclination detecting signal" can be corrected by the seek position of the movable optical unit. Referring to FIG. 11 again, the distance between the stationary optical unit and the movable optical unit is getting greater as the seek position moves from Q1 to Q3. The "discrepancy between the optical axes" detected is getting greater as the seek position parts from the stationary optical unit for the same inclination of the tracking mirror 21. Therefore, when the correction of the "discrepancy between the optical axes" is carried out on the basis of the aforementioned inclination detecting signal, for instance, at a seek position far from the stationary optical unit like at the seek position Q3, the correction can not be properly carried out because of an excessive correction. To correct the discrepancy between the optical axes properly, the seek position is detected, and then "inclination detecting signal" is corrected to reduce the gain of correction of the discrepancy between the optical axes as the seek position parts from the stationary optical unit, whereby "inclination detecting correction signal" are obtained, and the movable optical unit can be controlled with servo drive in such a manner that the inclination detecting correction signal reaches zero.

Figure 9:
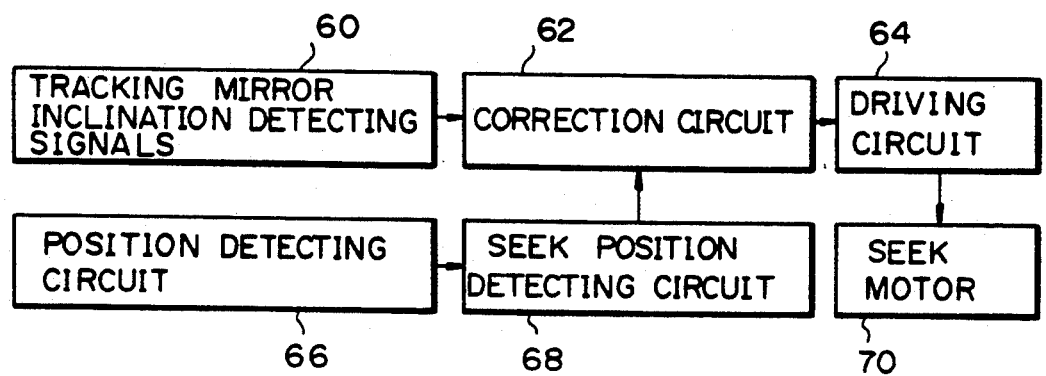

One example of circuitry for this purpose is shown in FIG. 9.

In a circuit 60, the aforementioned "inclination detecting signal" generates on the basis of the output from each light receiving portion of the light receiving element 25, and the signal is inputted to the correction circuit 62. On the other hand, the position detecting circuit 66 detects the seek position of the movable optical unit by the sector on the optical disk, and a signal representative of the detected seek position is inputted to the seek position detecting circuit 68. The circuit 68 encodes the detected seek position, and inputs the thus encoded signal to the correction circuit 62. The correction circuit 62 which is a variable gain amplifier amplifies "inclination detecting signal" in accordance with the gain regulated by the signal from the circuit 68 and outputs the thus amplified signal "inclination detecting correction signal". The gain adjustment for the correction circuit 62 by the output of the seek position detecting circuit 68 can be carried out, of course, so as to reduce the gain as the seek position parts from the stationary optical unit. The relationship between the gain and the seek position can be previously experimentally determined. The inclination detecting correction signal obtained in such way is inputted to the drive circuit 64, so that the seek motor 70 is driven by the circuit 64, and the movable optical unit is moved, whereby the preferable correction of the discrepancy between the optical axes is executed.

There are various ways of detecting the seek position of the movable optical unit available, therefore it is apparent that the methods for detecting the seek position are not be limited to the aforementioned methods. And also the method of correcting inclination detecting signal into inclination detecting correction signals may be carried out by a micro computer.

Many widely different embodiments of the present invention may be constructed without departing from the spirit and scope of the present invention. It should be understood that the present invention is not limited to the specific embodiments described in the specification, except as defined in the appended claims.

What is claimed is:

1. A separation type optical pick-up device, comprising:
a light emitting means fixed on a stationary base for emitting a light beam;
a beam splitting means, fixed on said stationary base in an optical path of said emitted light beam, for transmitting said emitted light beam and for deflecting a light beam returned from an optical information recording medium in a direction perpendicular to said optical path;
a carriage movably disposed along said optical path;
a deflection means mounted on said carriage for deflecting said transmitted light beam toward said optical information recording medium and for deflecting said returned light beam toward said beam splitting means;
an object lens movably mounted on said carriage for condensing said deflected light beam onto said optical information recording medium;
a focus actuator mounted on said carriage for moving said object lens so as to focus said object lens;
a tracking actuator mounted on said carriage for moving said object lens so as to track a track of said optical information recording medium;
a signal detecting means comprising a light receiving element divided into six parts by two diagonal lines and an additional split line which passes through an intersection point of said two diagonal split lines and extends in a direction corresponding to a direction of said track, said signal detecting means being disposed on an optical path of said returned light beam deflected by said beam splitting means, for receiving said returned light beam deflected by said beam splitting means, for detecting amounts of light received by each of two parts thereof partitioned by said additional split line, and for outputting a voltage signal representing a difference between said detected amounts;

a condenser lens disposed between said beam splitting means and said light receiving element for converging said deflected light beam from said beam splitting means;

a cylindrical lens disposed between said condenser lens and said light receiving element for imparting an astigmatism to said converged light beam from said condenser lens; and a servo control means electrically connected to said signal detecting means and mechanically connected to said carriage for servo-controlling said carriage on the basis of said voltage signal from said signal detecting means to thereby correct the discrepancy between an optical axis of said object lens and an optical axis of a light beam incident on said object lens from said deflection means.

2. A separation type optical pick-up device, comprising:

a light emitting means fixed on a stationary base for emitting a light beam;

a beam splitting means, fixed on said stationary base in an optical path of said emitted light beam, for transmitting said emitted light beam and for deflecting a light beam returned from an optical information recording medium in a direction perpendicular to said optical path;

a carriage movably disposed along said optical path;

a tracking mirror means, pivotably mounted on said carriage for deflecting said transmitted light beam toward said optical information recording medium, for tracking a track of said optical information recording medium and for deflecting said returned light beam toward said beam splitting means;

an object lens movably mounted on said carriage for condensing said deflected light beam on said optical information recording medium;

a focus actuator mounted on said carriage for moving said object lens so as to focus said object lens;

a signal detecting means comprising a light receiving element divided into six parts by two diagonal split liens and an additional split line which passes through an intersection point of said two diagonal split lines and extends in a direction corresponding to a direction of said track, said signal detecting means being disposed on an optical path of said returned light beam deflected by said beam splitting means, for receiving said returned light beam deflected by said beam splitting means, for detecting amounts of light received by each of two parts thereof partitioned by said additional split line, and for outputting a voltage signal representing a difference between said detected amounts;

a condenser lens disposed between said beam splitting means and said light receiving element for converging said deflected light beam from said beam splitting means;

a cylindrical lens disposed between said condenser lens and said light receiving element for imparting an astigmatism to said converged light beam from said condenser lens; and a servo-control means electrically connected tos aid signal detecting means and mechanically connected to said carriage for servo-controlling said carriage on the basis of said voltage signal from said signal detecting means, to thereby correct the discrepancy between an optical axis of said object lens and an optical axis of a light beam incident on said object lens from said tracking mirror means.

3. A separation type optical pick-up device, comprising:

a light emitting means fixed on a stationary base for emitting a light beam;

a beam splitting means, fixed on said stationary base in an optical path of said emitted light beam, for transmitting said emitted light beam and for deflecting a light beam returned from an optical information recording medium in a direction perpendicular to said optical path;

a first deflection prism, fixed in said optical path on said stationary base, for deflecting said transmitted light beam in a direction crossing said optical path, and for deflecting said returned light beam toward said beam splitting means;

a tracking mirror means pivotably mounted on said stationary base in an optical path of said deflected light beam from said first deflection prism for deflecting said deflected light beam in a direction crossing said optical path of said deflecting light beam, for deflecting said returned light beam toward said first deflection prism and for tracking a track of said optical information recording medium;

a carriage movably disposed along an optical path of a light beam deflected by said tracking mirror means;

a second deflection prism mounted on said carriage for deflecting said deflected light beam from said tracking mirror means, and for deflecting said returned light beam toward said tracking mirror means;

an object lens movably mounted on said carriage for condensing said deflected light beam from said second deflection prism on said optical information recording medium and for collimating said returned light beam;

a focus actuator mounted on said carriage for moving said object lens so as to focus said object lens;

a signal detecting means comprising a light receiving element divided into six parts by two diagonal split lines and an additional split line which passes through an intersection point of said two diagonal split lines and extends in a direction corresponding to a direction of said track, said signal detection means being disposed on an optical path of said returned light beam deflected by said beam splitting means, for receiving said returned light beam deflected by said beam splitting means, for detecting amounts of light received by each of two parts thereof partitioned by said additional split line, and for outputting a tracking mirror inclination detecting signal on the basis of a voltage signal representing a difference between said detected amounts;

a condenser lens disposed between said beam splitting means and said light receiving element for conveying said deflected light beam from said beam splitting means;

a cylindrical lens disposed between said condenser lens and said light receiving element for imparting an astigmatism to said converged light beam from said condenser lens;

a seek position detecting means for detecting a seek position of said carriage and for outputting a seek position signal representing said seek position;

a signal correcting means electrically connected to said signal detecting means and said seek position detecting means for correcting said tracking mirror inclination detecting signal from said signal detecting means on the basis of said seek position signal from said seek position detecting means, and for outputting a corrected inclination detecting signal; and a servo-control means electrically connected to said signal correcting means and mechanically connected to said carriage for servo-controlling said carriage on the basis of said corrected inclination detecting signal from said signal correcting means to thereby correct the discrepancy between an optical axis of said object lens and an optical axis of a light beam incident on said object lens from said second deflection prism.

* * * * *